(12) United States Patent
Iguchi et al.

(10) Patent No.: US 11,019,320 B2
(45) Date of Patent: May 25, 2021

(54) STORAGE METHOD, PLAYBACK METHOD, STORAGE APPARATUS, AND PLAYBACK APPARATUS

(71) Applicant: Panasonic Intellectual Property Corporation of America, Torrance, CA (US)

(72) Inventors: Noritaka Iguchi, Osaka (JP); Tadamasa Toma, Osaka (JP); Takahiro Nishi, Nara (JP); Hisaya Katou, Kyoto (JP)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 14/965,900

(22) Filed: Dec. 11, 2015

(65) Prior Publication Data

US 2016/0099026 A1 Apr. 7, 2016

Related U.S. Application Data

(63) Continuation of application No. PCT/JP2014/003801, filed on Jul. 17, 2014.

(Continued)

(30) Foreign Application Priority Data

Jul. 2, 2014 (JP) ............................. JP2014-136938

(51) Int. Cl.
*H04N 9/804* (2006.01)
*G11B 27/10* (2006.01)
(Continued)

(52) U.S. Cl.
CPC ......... *H04N 9/8042* (2013.01); *G11B 27/102* (2013.01); *G11B 27/327* (2013.01);
(Continued)

(58) Field of Classification Search
CPC .... H04N 9/8042; H04N 5/76; H04N 21/4334; H04N 21/8456; G11B 27/102; G11B 27/327
See application file for complete search history.

(56) References Cited

U.S. PATENT DOCUMENTS 6,801,709 B1 * 10/2004 Park .................. H04N 5/44508
386/345
6,993,248 B1 * 1/2006 Kato .................... G11B 27/105
386/241

(Continued)

FOREIGN PATENT DOCUMENTS

EP   1 043 892    10/2000
JP   2000-341640  12/2000

(Continued)

OTHER PUBLICATIONS

Extended European Search Report dated Jun. 17, 2016 in corresponding European Application No. 14830355.5.

(Continued)

*Primary Examiner* — Mishawn N. Hunter
(74) *Attorney, Agent, or Firm* — Wenderoth, Lind & Ponack, L.L.P.

(57) ABSTRACT

A storage method according to one aspect includes: a reception step of receiving a coded stream including a plurality of files that are of a data unit in a predetermined file format; a storage step of storing the received plurality of files of the coded stream in a memory; and a generation step of generating first control information used to play back the stored plurality of files, the first control information correlating the plurality of files. Therefore, the method for storing data in which one coded stream is divided into a plurality of files is provided.

7 Claims, 10 Drawing Sheets

Related U.S. Application Data

(60) Provisional application No. 61/856,784, filed on Jul. 22, 2013.

(51) Int. Cl.
*G11B 27/32* (2006.01)
*H04N 21/433* (2011.01)
*H04N 21/845* (2011.01)
*H04N 5/76* (2006.01)

(52) U.S. Cl.
CPC ............ *H04N 5/76* (2013.01); *H04N 21/4334* (2013.01); *H04N 21/8456* (2013.01)

(56) References Cited

U.S. PATENT DOCUMENTS

| | | | |
|---|---|---|---|
| 2005/0254798 A1 | 11/2005 | Kato | |
| 2006/0149781 A1* | 7/2006 | Blankinship | G11B 27/034 |
| 2006/0209745 A1* | 9/2006 | MacMullan | H04N 21/43637 370/328 |
| 2006/0239647 A1* | 10/2006 | Mori | G11B 27/105 386/248 |
| 2008/0254751 A1* | 10/2008 | Lazaridis | H04M 1/7253 455/74 |
| 2008/0273862 A1 | 11/2008 | Okamoto et al. | |
| 2009/0083856 A1* | 3/2009 | Aisu | G06F 21/10 726/26 |
| 2011/0113123 A1* | 5/2011 | Takagaki | G11B 27/105 709/219 |
| 2012/0271911 A1* | 10/2012 | Igari | G11B 27/034 709/217 |
| 2013/0094832 A1* | 4/2013 | Ishihara | G11B 27/002 386/230 |
| 2013/0125187 A1* | 5/2013 | Kim | H04N 21/23608 725/109 |
| 2013/0195424 A1 | 8/2013 | Ohashi | |
| 2013/0291040 A1 | 10/2013 | Rhyu et al. | |
| 2013/0293677 A1 | 11/2013 | Lee et al. | |
| 2014/0007172 A1* | 1/2014 | Rhyu | H04N 21/2362 725/109 |
| 2015/0156519 A1* | 6/2015 | Watanabe | H04N 5/77 725/116 |

FOREIGN PATENT DOCUMENTS

| | | |
|---|---|---|
| JP | 2006-528472 | 12/2006 |
| JP | 2013-157734 | 8/2013 |
| WO | 2011/159140 | 12/2011 |
| WO | 2012/099359 | 7/2012 |
| WO | 2012/099399 | 7/2012 |

OTHER PUBLICATIONS

Text of ISO/IEC DIS 23008-1 MPEG Media Transport 104. MPEG Meeting;Apr. 22, 2013-Apr. 26, 2013; Incheon; (Motion Picture Expert Group or ISO/IEC JTC1/SC29/WG11),, No. N13516, May 10, 2013 (May 10, 2013), XP030020266.

International Search Report of PCT application No. PCT/JP2014/003801 dated Oct. 7, 2014.

"Information technology—High efficiency coding and media delivery in heterogeneous environments—Part1:MPEG media transport(MMT)" ISO/IEC FDIS 23008-1, 2013.

* cited by examiner

*FIG. 8*

| ID | MEDIA A | MEDIA B |
|---|---|---|
| 1 | MP4 #1 | MP4 #1 |
| 2 | MP4 #2 | MP4 #5 |
| 3 | MP4 #3 | MP4 #9 |
| 4 | MP4 #4 | MP4 #15 |
| 5 | MP4 #5 | MP4 #19 |
| 6 | MP4 #6 | MP4 #21 |
| 7 | MP4 #7 | MP4 #24 |
| ⋮ | ⋮ | ⋮ |

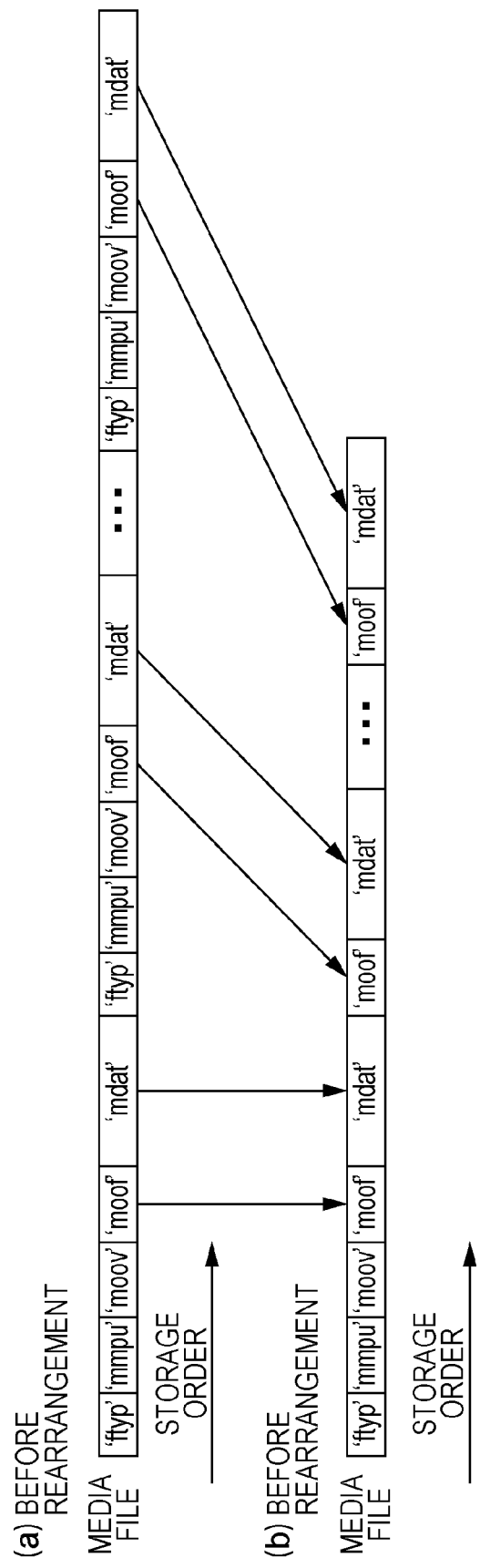

STORAGE METHOD, PLAYBACK METHOD, STORAGE APPARATUS, AND PLAYBACK APPARATUS

BACKGROUND

1. Technical Field

The present disclosure relates to a storage method, a playback method, a storage apparatus, and a playback apparatus.

2. Description of the Related Art

Conventionally, there is well known a technology of transmitting coded data in a predetermined transmission format. The coded data is generated by coding a content including video data and audio data based on a video coding standard such as HEVC (High Efficiency Video Coding). Examples of the predetermined transmission format includes MPEG-2 TS (Moving Picture Experts Group-2 Transport Stream) and MMT (MPEG Media Transport) (for example, see NPTL 1). For example, NPTL 1 discloses a technology of transmitting coded media data in each packet in conformity with the MMT.

On the other hand, the storage method and apparatus for receiving and storing the data in which one stream is divided into a plurality of files like the MMT system and the playback method and apparatus for playing back the stored data are not taken into consideration.

CITATION LIST

Non-Patent Literature

NPTL 1: Information technology—High efficiency coding and media delivery in heterogeneous environments—Part 1: MPEG media transport (MMT), ISO/IEC FDIS23008-1

SUMMARY

In one general aspect, the techniques disclosed here feature a storage method including a reception step of receiving a coded stream including a plurality of files that are of a data unit in a predetermined file format, a storage step of storing the received plurality of files of the coded stream in a memory, and a generation step of generating first control information used to play back the stored plurality of files, the first control information correlating the plurality of files with each other.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a memory medium, or any selective combination thereof.

BRIEF DESCRIPTION OF DRAWINGS

FIG. 8 is a view illustrating an example of a random access table;

FIG. 11 is a view illustrating data in a media file when the data is rearranged in the media file.

DESCRIPTION OF EMBODIMENT

Figure 1:
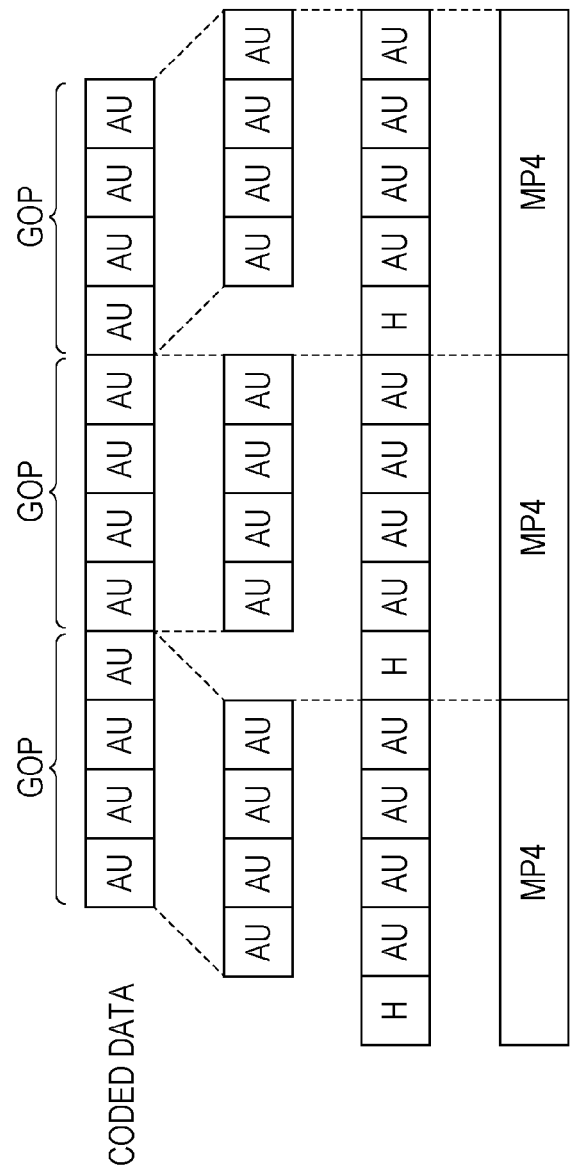
FIG. 1 is a view illustrating a data structure of a coded stream in the MMT.

Underlying Knowledge Forming Basis of the Present Disclosure

The present disclosure relates to storage method and apparatus for receiving and data transmitted by the MMT system which is currently standardized in MPEG, and storing the received data and playback method and apparatus for playing back the stored data. The MMT system is a multiplexing system, in which video and audio are packetized while multiplexed, and transmitted through at least one transmission passage such as broadcasting and communication.

In a conventional system in which the MPEG-2 TS system is used as the multiplexing system, there is a method for directly storing a TS packet. However, a method for receiving and storing the data packetized by the MMT system or a method for playing back the stored data is insufficiently considered in the conventional system.

An MPU (Media Processing Unit) generated by the MMT system is data in which the video and audio are divided into proper sizes in each piece of media and stored in an MP4 format.

For a conventional MP4 file, video and audio tracks are stored in one MP4 file, and information indicating a relationship between the tracks is stored in a header of the MP4. On the other hand, the MPU is an MP4 file in which a program is segmented in each piece of media, but information indicating a relationship between the media does not exist in the MPU. Therefore, the associated video and audio cannot simultaneously be played back.

When the MPU is stored as a plurality of MP4 files, the number of files increases, and access to the file becomes troublesome during file management or playback, which results in a problem in that throughput necessary for playback processing increases.

In order to solve the problem, a storage method according to one aspect of the present disclosure includes a reception step of receiving a coded stream including a plurality of files that are of a data unit in a predetermined file format, a storage step of storing the received plurality of files of the coded stream in a memory, and a generation step of generating first control information used to play back the stored plurality of files, the first control information correlating the plurality of files.

Therefore, even in the data stored as the plurality of files, the plurality of files are stored while correlated with each other, so that the throughput associated with the playback processing can be reduced.

For example, the coded stream may include second control information, and, in the generation step, information indicating order of playing back the plurality of files may be generated as the first control information by analyzing the second information.

For example, the plurality of files may include a first file belonging to first media and a second file belonging to second media, and, in the generation step, information correlating the first file and the second file may be generated as the first control information by analyzing the second control information.

For example, each of the plurality of files may be a randomly accessible file having a random access unit, and, in the generation step, clock time information indicating a playback start clock time of each of the plurality of files may be generated as the first control information by analyzing the second control information.

For example, in the generation step, the information correlating the first file and the second file may be generated as the first control information, the first file and the second file being identical to each other in the playback start clock time.

For example, in the generation step, information indicating recording positions in the memory of the plurality of files may be generated as the first control information when the plurality of files are stored in the memory in the storage step.

A playback method according to another aspect of the present disclosure for playing back a plurality of files stored in a memory, the plurality of files being a data unit in a predetermined file format, the playback method includes: a first obtaining step of acquiring control information used to play back the plurality of files, the control information correlating the plurality of files; an analysis step of analyzing the obtained control information; a second obtaining step of acquiring a predetermined file in the plurality of files from the memory according to a result of the analysis step; and a playback step of playing back the obtained predetermined file.

These overall or specific aspects may be implemented by a storage apparatus, a playback apparatus, an integrated circuit, a computer program, and a recording medium such as a computer-readable CD-ROM, or implemented by any combination of the storage apparatus, the playback apparatus, the integrated circuit, the computer program, and the recording medium.

Hereinafter, a transmission method and a reception method according to an exemplary embodiment of the present disclosure will specifically be described with reference to the drawings.

The following exemplary embodiment illustrates a specific example of the present disclosure. The following numerical value, shape, material, component, disposition and connection form of the component, step, and step sequence indicated in the exemplary embodiment are described only by way of example, but not limit the present disclosure. In the following components of the exemplary embodiment, the component that is not described in an independent claim indicating a highest concept is described as an arbitrary component.

Exemplary Embodiment

Hereinafter, a storage method (storage apparatus) and a playback method (playback apparatus) according to an exemplary embodiment will be described with reference to the drawings. By way of example, a storage method for storing coded data received in conformity with the MMT and a playback method for playing back the stored coded data are described in the exemplary embodiment.

Figure 2:
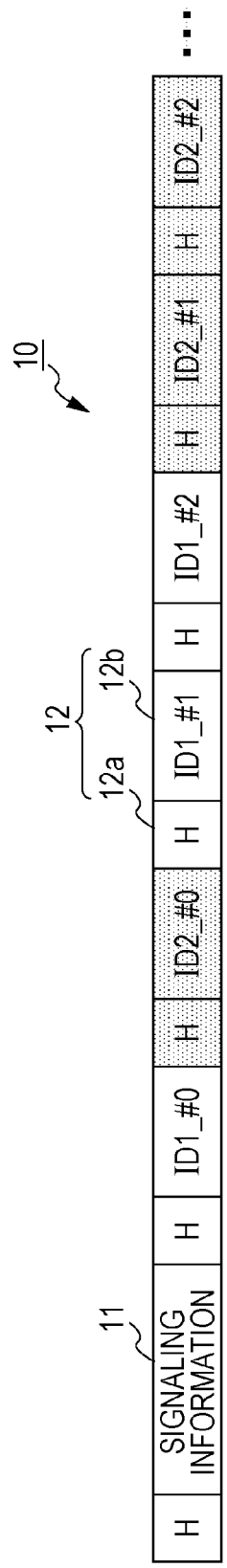
FIG. 2 is a view illustrating a data structure of a coded stream in the MMT.

A data structure of a coded stream in the MMT will be described below. FIGS. 1 and 2 are views illustrating the data structure of the coded stream in the MMT.

As illustrated in FIG. 1, the coded data is constructed with a plurality of access units (AUs). For example, the coded data is AV data that is coded based on a video coding standard such as HEVC. Specifically, the coded data includes video data, audio data, and captions, character super, metadata, a still image, and a file associated therewith. In the case where the coded data is the video data, one AU is a unit corresponding to one picture (one frame).

In the MMT, the coded data is converted into the MP4 data (an MP4 header is provided) in a GOP (Group Of Picture) unit according to an MP4 file format (ISO-based media data format). That is, the coded data includes a plurality of sets (GOP) each of which is constructed with the plurality of access units. The GOP is a random access point in the coded data, and the leading access unit corresponds to an IDR picture of HEVC or AVC or a non-IDR I picture in decoding order in the GOP.

A relative value of a presentation clock time (the PTS) or a decoding clock time (the DTS) of the access unit is described in the MP4 header included in the MP4 data. A sequence number of the MP4 data is described in the MP4 header. The MP4 data (MP4 file) is an example of the MPU that is of a data unit defined in the MMT standard. In the MPU, the MP4 header is not transmitted, but only sample data in the MPU may be transmitted. In this case, the MPU corresponds to a random access unit, and a sample constituting the MPU and the MPU are correlated with each other. The random access point that is of a leading access unit of the random access unit is disposed at a head in the MPU. The MPU may be constructed with a plurality of GOPs. The MPU is a set of access units of video or audio single media, and encapsulated in the MP4 file format in each piece of media. As used herein, "media" means a kind of a content such as video, audio, and captions.

As illustrated in FIG. 2, coded stream 10 in the MMT includes signaling information 11 and a plurality of MMT packets 12. In other words, coded stream 10 is a packet string of MMT packets 12.

Coded stream 10 (MMT stream) is a at least one of a stream constituting one MMT package. For example, the MMT package corresponds to one broadcasting program content.

For example, signaling information 11 includes information indicating a correspondence relation between a plurality of assets and a packet ID. The asset is a data entity including data of an identical transport characteristic. For example, the asset is one of the video data and the audio data.

Specifically, for example, signaling information 11 is CI (Composition Information) and an MPT (MMT Package Table) in the MMT. Signaling information 11 is a PMT (Program Map Table) or a PAT (Program Association Table) in MPEG2-TS, and is an MPD (Media Presentation Description) in MPEG-DASH.

The clock time information may be included in signaling information 11. The clock time information is one used to decide the PTS or DTS of the access unit. Specifically, for example, the clock time information is the PTS or DTS that is of an absolute clock time of the leading access unit in the MPU. More specifically, the clock time information can indicate the absolute value of the PTS of the leading access unit in presentation order in the MPU for the PTS, and indicate the absolute value of the DTS of the leading access unit in decoding order in the MPU for the DTS. The clock time information needs not to be stored in signaling information 11.

For example, assuming that the plurality of pictures constitute one set, the leading access unit initially decoded in the decoding order of the set is decoded at the clock time indicated by the DTS. At this point, the clock time information indicating the clock time (DTS) based on a reference clock may be stored as the clock time information on coded stream 10, the leading access unit of the set being decoded at the clock time (DTS).

The reference clock means an NTP (Network Time Protocol) in the case where the coded stream is transmitted by the MMT system, and means a PCR (Program Clock Reference) in the case where the coded stream is transmitted by the MPEG2-TS system. The NTP may be the reference clock set by a transmission apparatus, but the NPT is not necessarily matched with an NTP value of an NTP server generally used in the Internet.

MMT packet 12 is data in which the MP4 data is packetized. In the exemplary embodiment, one MMT packet 12 includes one piece of MP4 data (MPU). As illustrated in FIG. 2, MMT packet 12 includes header 12a (MTT packet header (corresponds to a TS packet header for MPEG2-TS)) and payload 12b.

The MP4 data is stored in payload 12b. Sometimes the divided MP4 data is stored in payload 12b.

Header 12a is attached information on payload 12b. For example, header 12a includes the packet ID and the clock time information. The clock time information is a relative value of a presentation clock time (PTS) or a decoding clock time (DTS) of the MP4 data.

The packet ID is an identification number indicating the asset of the data included in MMT packet 12 (payload 12b). The packet ID is an individual identification number of each asset constituting the MMT package.

Thus, the coded stream includes the clock time information (DTS or PTS) indicating the clock time at which the processing of decoding or presenting the coded data is performed, and the coded data (ID1_#0, ID2_#0, ID1_#1, ID1_#2, ID2_#1, ID2_#2, . . . in FIG. 2).

Storage Method

Figure 3:
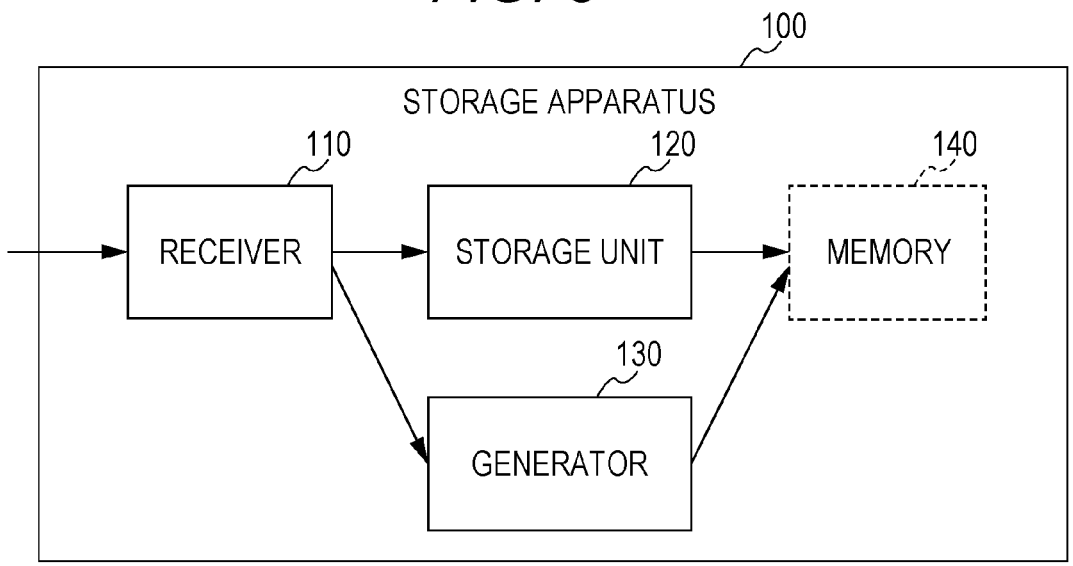
FIG. 3 is a block diagram illustrating a configuration of a storage apparatus according to an exemplary embodiment.
Figure 4:
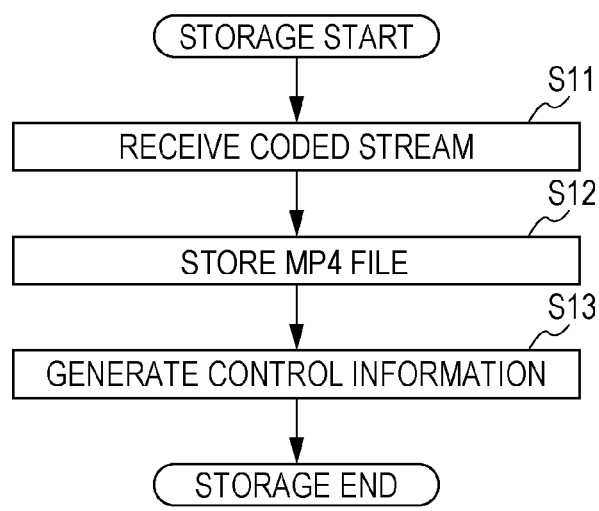
FIG. 4 is a flowchart illustrating a storage method according to an exemplary embodiment.

FIG. 3 is a block diagram illustrating a configuration of a storage apparatus according to an exemplary embodiment. FIG. 4 is a flowchart illustrating a storage method according to an exemplary embodiment.

As illustrated in FIG. 3, storage apparatus 100 includes receiver 110, storage unit 120, generator 130, and memory 140. Specifically, the components of storage apparatus 100 are constructed with a microcomputer, a processor, or a dedicated circuit. Memory 140 needs not to be included in storage apparatus 100, but memory 140 may be separated from storage apparatus 100.

In the storage method of the exemplary embodiment, as illustrated in FIG. 4, receiver 110 of storage apparatus 100 receives the coded stream including a plurality of files that is of a data unit of a predetermined file format (S11: reception step).

Then, storage unit 120 of the storage apparatus stores the plurality of files received in the coded stream in memory 140 (S12: storage step). Specifically, the data units (that is, the MP4 file) in the plurality of MP4 file formats are obtained from the reception packet constituting received coded stream 10.

Then, generator 130 of the storage apparatus generates the first control information, which is used to play back the stored plurality of MP4 files and correlates the plurality of MP4 files (S13: generation step). The following three pieces of control information are included in the first control information generated in Step S13.

The three kinds of pieces of control information include information (later-described control file A31) indicating recording positions of the plurality of MP4 files in memory 140, program information (later-described control file B32), and information (control file C33) indicating a random access table. That is, Step S13 includes a step of generating control file A31, a step of generating control file B32, and a step of generating control file C33.

For example, in the generation step, the information indicating the order of playing back the plurality of MP4 files may be generated as the first control information by analyzing the signaling information (second control information).

For example, in the generation step, information correlating the first file having the video media and the second file having the audio media may be generated as the first control information by analyzing the signaling information. More specifically, each of the plurality of MP4 files may be a randomly accessible file having a random access unit, and, in the generation step, clock time information indicating a playback start clock time of each of the plurality of MP4 files may be generated as the first control information (control file B32) by analyzing the signaling information. In the generation step, the information correlating the first file and the second file may be generated as the first control information (control file C33), the first file and the second file being identical to each other in the playback start clock time.

In the generation step, information indicating recording positions in memory 140 of the plurality of MP4 files may be generated as the first control information (control file A31) when the plurality of MP4 files are stored in memory 140 in the storage step.

The control information generated in Step S13 is stored in memory 140 together with the plurality of MP4 files, and the storage is ended when the reception of the coded stream for a predetermined time is ended.

The first control information and the second control information are different from each other. The first control information is one that is used to play back the stored plurality of MP4 files. The second control information is one that is used to play back the coded stream in real time when the coded stream is received. That is, for example, the first control information is one that is used to recorded (store) broadcast content and to play back the recorded content. For example, the second control information is one that is used to play back the content received in real time by the broadcasting or communication.

Each detailed step of the storage method will specifically be described with reference to the drawings.

Figure 5:
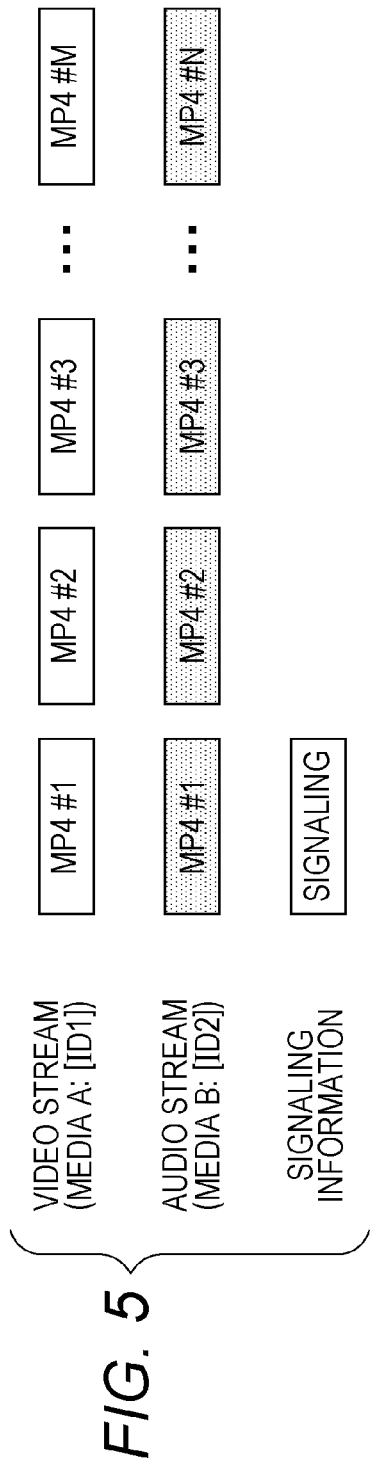
FIG. 5 is a view illustrating data which is coded using an MMT system and data in which an MPU is obtained from an MMT packet in each piece of media.
Figure 6:
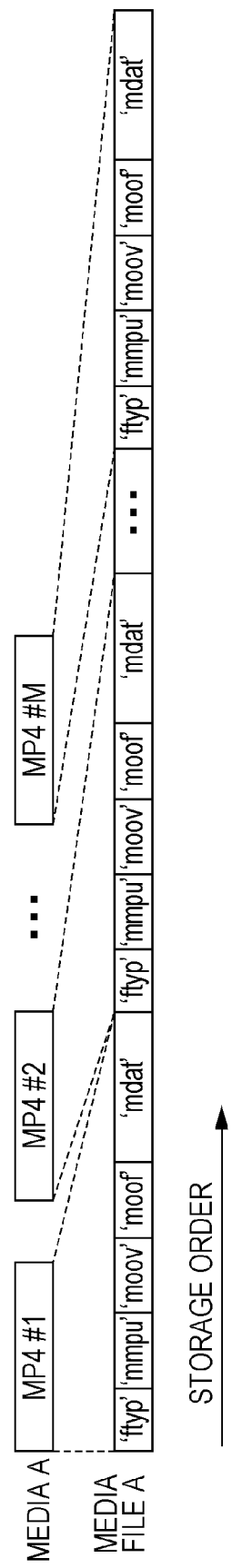
FIG. 6 is a view illustrating a configuration of media file A21 that is constructed by storing a file of media A (video)

FIG. 5 is a view illustrating data which is coded using an MMT system and data in which an MPU is obtained from an MMT packet in each piece of media. FIG. 6 is a view illustrating a configuration of media file A21 that is constructed by storing a file of media A (video).

In received coded stream 10, MMT packet 12 is filtered using a packet ID. After header 12a such as an MMT packet header and a payload header are removed, filtered MMT packet 12 becomes the plurality of MP4 files in each piece of media. An identifier of each piece of media and the sequence number of the MP4 file constituting the identical media are described in the header of the MP4 file.

A plurality of kinds of signaling information are received separately from the MP4 file. For example, a table indicating the relationship between the media, the playback time of the MP4 leading access unit, and information on activation of an application are included in the signaling information, and the signaling information is received once or repeatedly received.

Figure 7:
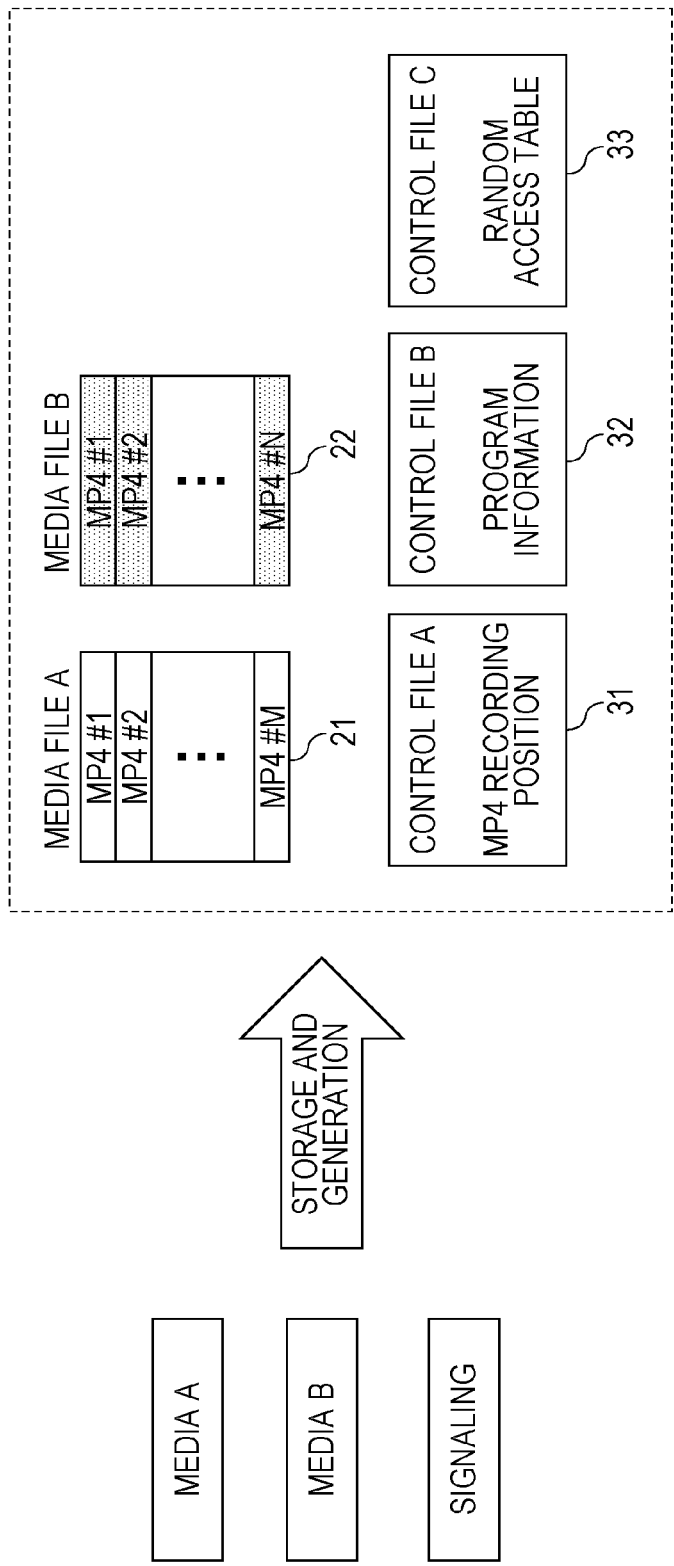
FIG. 7 is a view illustrating a specific example in which, based on a received file and second control information, a file is stored and control information is generated.

FIG. 7 is a view illustrating a specific example in which, based on the received file and second control information, the file is stored and the control information is generated.

In the storage method of the exemplary embodiment, the obtained MP4 file is directly stored in the file in each piece of media. At the same time, the control information indicating the relationship between the media and information necessary for the playback of other programs are generated as the control files A31 to C33 (first control information). In playing back the program, MP4 of the file is analyzed in each piece of media while the control information is referred to, and the video and audio are played back.

Operation to transmit one program through a single transmission passage using the MMT system and to receive and store the program using a receiving apparatus will be described by way of example. It is assumed that the program is constructed with media A and media B, and that the information (the information indicating the relationship between the media) constituting the program is stored in the signaling information.

The MP4 file obtained in the reception step is stored in memory 140 by storing the MP4 file in the media file in each piece of media. For example, the MP4 files of M media A having sequence numbers #1 to #M are sequentially stored in media file A21, and the MP4 files of N media B having sequence numbers #1 to #N are sequentially stored in media file B22.

A previously-fixed file name in which the media can be specified may be set in the media file. An identifier identifying a kind of the media of the file stored in the media file may be stored in the media file. For example, an asset ID provided to each of the plurality of media by the MMT method or an identifier corresponding to the asset ID may be used as the identifier identifying a kind of the media. In the case where the identifier is stored in the media file, an MP4 box is newly provided and the identifier may be stored in the MP4 box.

In the generation step, when the MP4 file is stored in the media file, information for specifying a position of the MP4 file is generated in each MP4 file, and the MP4 file is stored in the control file (control file A31 in FIG. 7). For example, the position specifying information specifying the position recorded in each MP4 file is indicated by an offset amount of the number of bytes from the head of the media file to a leading byte of the MP4 file having each sequence number with respect to the media identifier. In the case where the MMT system is used, the position specifying information indicates a recording position of the MP4 file with respect to the asset ID.

In the reception step, the signaling information in which the information on the media constituting the program is described is received, and the obtained signaling information is stored in the control file (for example, control file B32 in FIG. 2). The file name of the media file in which the MP4 file of the media constituting the program is stored is stored in the signaling information. The signaling information includes signaling information transmitted only once, signaling information repeatedly transmitted, and signaling information that is transmitted while divided into plurality of pieces. In the generation step, in each case, the information necessary to the playback of the program is obtained (generated) from the signaling information, and stored in the file.

In the generation step, a random access table may be produced such that the random access can be performed during the playback. The random access table is a list of the randomly accessible points. For example, the random access table indicates the MP4 sequence number corresponding to the random access point in each of media A and media B.

FIG. 8 is a view illustrating an example of the random access table.

In the case where media A is the video while media B is the audio, the random access table is a table in which the MP4 sequence number of the video MP4 file and the MP4 sequence number of the audio MP4 file that is accessed at the same time as the random access point of the video MP4 file are correlated with each other.

Specifically, the random access table is generated in the following procedure. The random access point of the video MP4 file is generated based on the clock time information in the case where the clock time information on the leading access unit of the video MP4 file is transmitted as the signaling information. The MP4 sequence number of the audio MP4 file of the clock time information at the same clock time as the generated random access point of the video MP4 file is searched, the searched MP4 sequence number of the audio MP4 file and the MP4 sequence number of the video MP4 file used in the search are correlated with each other to generate the random access table. That is, in the generation step, the generated random access table is stored in the control file (for example, control file C33 in FIG. 7).

The random access table is not necessarily the list of all the randomly accessible points, but the random access table may be constructed with random access points at constant intervals (that is, some of the random access points are thinned out such that the constant interval is obtained) at constant intervals.

In the random access table, the clock time information corresponding to each random access point may further be correlated. In this case, the clock time information is a relative time from the leading clock time (program playback start clock time) of the media. More specifically, the clock time information is a relative clock time of the MP4 file calculated from the leading clock time of the media in the case where the clock time information on the leading access unit of the MP4 file is a time stamp provided based on the NTP or STC.

In the case where the storage is started from a half way of the program, the relative clock time corresponding to each of the plurality of MP4 files is calculated based on the clock time of the storage start data, and is stored in the random access table. The clock time information may be generated based on the time stamp described in the MP4 file header.

In the case where layout information or application information is signaled, the signaling information may be stored in the file.

In the case where the time stamp is provided to the signaling information, the leading clock time of the media may be stored together with the signaling information while converted into the relative clock time.

In the generation step, event information such as the layout information and the application activation information may be stored in the program information or the random access table. In this case, the presentation may be performed based on the time stamp information during the playback.

Even if the time interval of the audio MP4 file is not matched with the time interval (GOP unit) of the video MP4 file, the audio MP4 sequence number corresponding to the video random access point is searched to generate the random access table. Therefore, during the playback, the random access can easily be performed to the video MP4 file and the audio MP4 file that should be played back at the same time as the video MP4 file.

In the case where the plurality of random access points exist in the video MP4 file, the number of random access points included in the MP4 file may be transmitted while stored in the header information. In this case, in the random access table, each of the plurality of random access points of the video MP4 file is correlated with the MP4 sequence number of the audio MP4 file. In the random access table, the audio MP4 file is further correlated with information indicating the order of the plurality of random access points of the video MP4 file.

Playback Method

A playback method for playing back the plurality of MP4 files stored in memory 140 will be described below.

Figure 9:
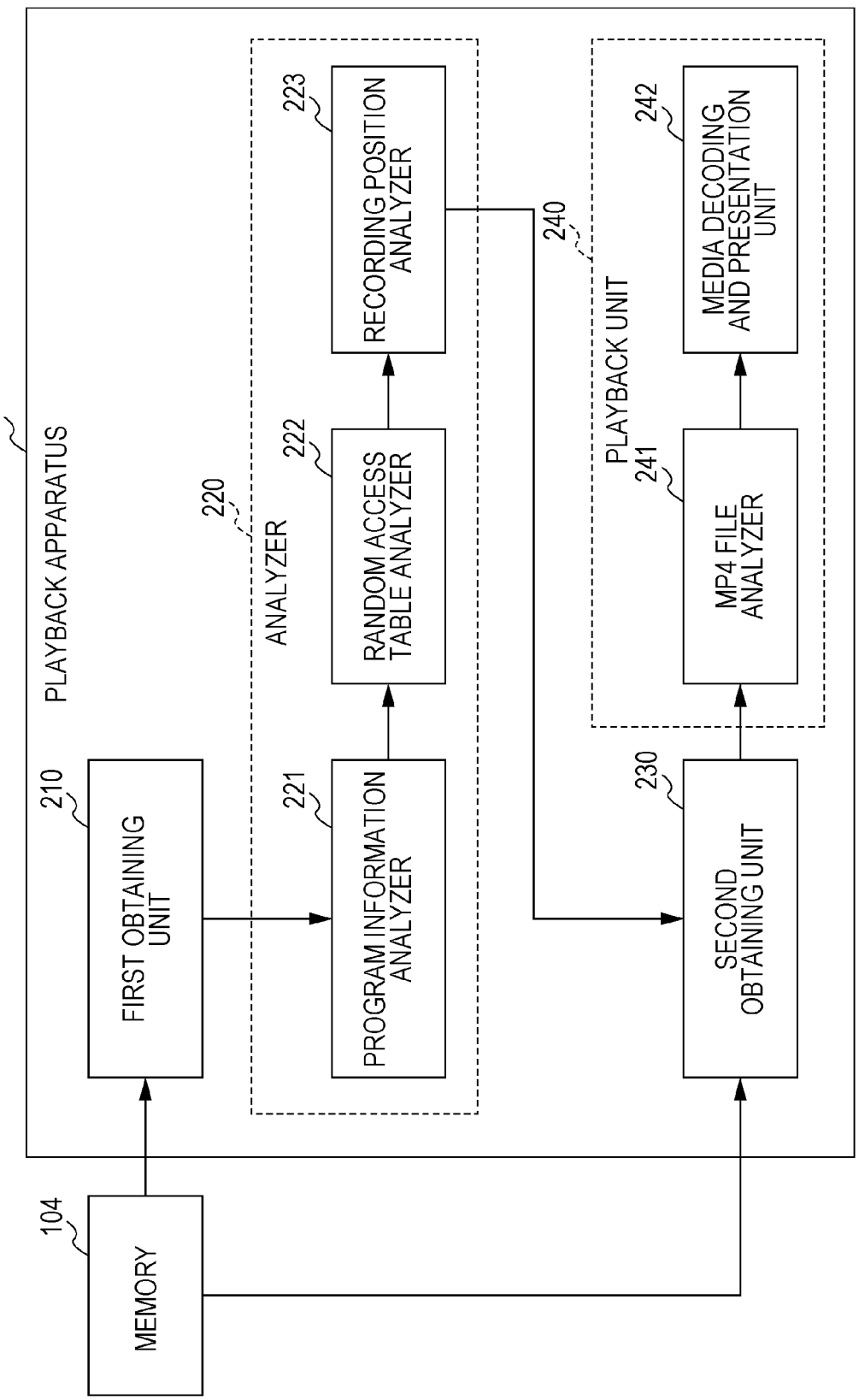
FIG. 9 is a block diagram illustrating a configuration of a playback apparatus according to an exemplary embodiment.
Figure 10:
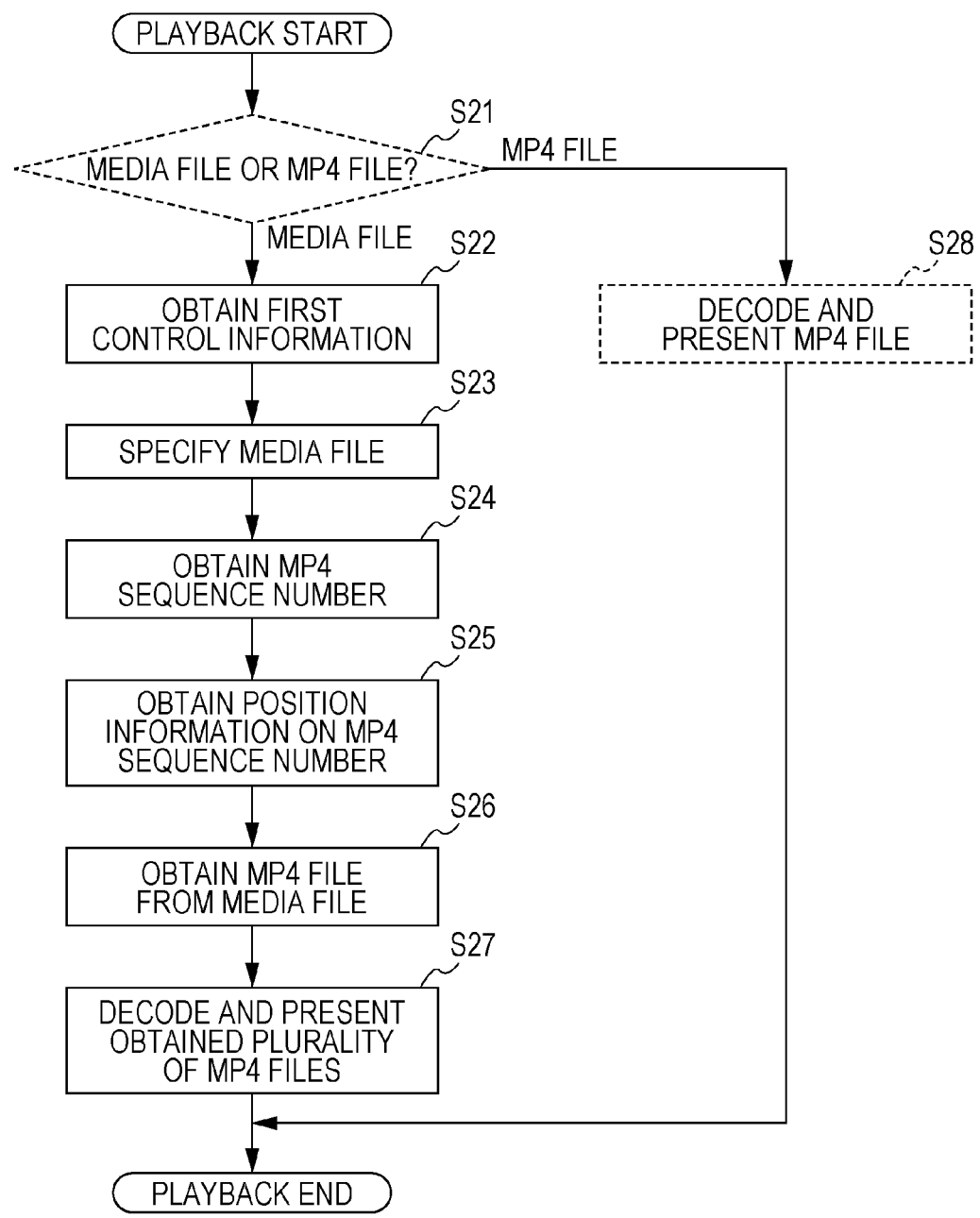
FIG. 10 is a flowchart illustrating a playback method according to an exemplary embodiment.

FIG. 9 is a block diagram illustrating a configuration of a playback apparatus according to an exemplary embodiment. FIG. 10 is a flowchart illustrating a playback method according to an exemplary embodiment.

As illustrated in FIG. 9, playback apparatus 200 includes first obtaining unit 210, analyzer 220, second obtaining unit 230, and playback unit 240. Specifically, the components of playback apparatus 200 are constructed with a microcomputer, a processor, or a dedicated circuit.

Playback apparatus 200 determines whether the target file to be played back is a file (media file) including the plurality of MP4 files or one MP4 file (S21).

When the target file is determined to be the media file (media file in S21), first obtaining unit 210 of playback apparatus 200 obtains first control information, which is used to play back the plurality of MP4 files and correlates the plurality of MP4 files (S22: first obtaining step). Specifically, first obtaining unit 210 obtains first control information stored in memory 140.

Then, in Steps S23 to S25 subsequent to Step S22, analyzer 220 of playback apparatus 200 analyzes the first control information obtained in Step S22 (analysis step).

More specifically, analyzer 220 includes program information analyzer 221, random access table analyzer 222, and recording position analyzer 223, and analyzers 221 to 223 perform pieces of processing in Steps S23 to S25, respectively.

Program information analyzer 221 analyzes control file B32 in the first control information to specify the media file constituting the program (S23).

Random access table analyzer 222 analyzes control file C33 in the first control information to obtain the MP4 sequence number at the random access point in each media (S24).

Recording position analyzer 223 analyzes control file A31 in the first control information, and obtains the position information indicating the recording position of the MP4 file stored in memory 140, the position information being correlated with the MP4 sequence number of the MP4 file obtained in Step S24 (S25).

Then, second obtaining unit 230 obtains a predetermined MP4 file in the plurality of MP4 files stored in memory 140 according to a result (the position information on the MP4 file) of the analysis step (S26: second obtaining step).

Then, playback unit 240 of playback apparatus 200 plays back the obtained MP4 file (S27: playback step). More specifically, playback unit 240 includes MP4 file analyzer 241 and media decoding and presentation unit 242. In Step S27, MP4 file analyzer 241 sequentially analyzes the plurality of MP4 files in each piece of media. Media decoding and presentation unit 242 decodes and presents the plurality of MP4 files based on the time stamp information analyzed by MP4 file analyzer 241, thereby performing the playback.

On the other hand, when the target file is determined to be one MP4 file (MP4 file in S21), the MP4 file is analyzed, and the decoding and the presentation are performed based on the MP4 time stamp information, thereby playing back the MP4 file (S28). Step S21 needs not to be performed. Step S28 needs not to be performed.

Features

In the storage method and playback method of the exemplary embodiment, the program coded by the MMT system can be stored and played back.

In the storage method of the exemplary embodiment, the received plurality of MP4 files can collectively be stored in the file without changing the configuration of the MP4 file.

In the storage method of the exemplary embodiment, the control information such as the program information is generated and stored, which allows the playback of the stored plurality of MP4 files.

In the storage method of the exemplary embodiment, the random access playback can easily be performed by generating the random access table.

In the storage method of the exemplary embodiment, the layout information and the application activation information can be presented during the playback.

Modifications

The above storage method is described by way of example, and the present disclosure is not limited to the storage method of the exemplary embodiment.

The first control information may be stored in the plurality of files in each function, or the pieces of control information having at least two functions may collectively be stored in one file. The control information on the single media may be stored in the media file together with the media.

The media file and the control file may be specified by the previously-fixed file name. In the media file and the control file, an identifier identifying the content of the media or control information stored in the file may be stored in the file.

In the playback method, the control file in which the program information is stored is used as the entry point. Alternatively, a file constituting the entry point is separately defined, and the control file in which the program information is stored may be assigned to the entry point file.

The offset amount indicating the recording position of the MP4 file is indicated by the number of bytes. Alternatively, for example, a predetermined data unit is defined, and the offset amount may be indicated by an index number of the data unit. The recording position of the MP4 file may be the offset amount from the leading byte of the media file to the leading byte of the MP4 file. The recording position of the MP4 file may be difference information on the recording position between the leading bytes before and after the MP4 files.

The data coded by the MMT system is described above by way of example. Additionally, the storage and the playback can also be performed using the method of the exemplary embodiment in the case where the program constructed with the segmented plurality of MP4 files using the MPEG-DASH system or the like is stored. The storage and the playback can also be performed using the method of the exemplary embodiment in the case where the MP4 file coded by the MMT system or MPEG-DASH system is transmitted in an MPU or GFD mode in the protocol of the MMT system or other protocols such as FLUTE.

The arrangement of the pieces of data (MP4 file) in the media file may be changed after the plurality of MP4 files are stored in the media file in the reception order. In the case where the pieces of data in the media file are rearranged, the first control information or the MP4 file header is properly corrected in association with the rearrangement, information indicating that the rearrangement is already performed is stored in the media file or another control file different from the media file. The pieces of data in the media file need not to be rearranged after the storage, the pieces of data is temporarily stored in a memory during the reception of the plurality of MP4 files, and the storage may be performed while the rearrangement is performed.

For example, the rearrangement may be performed such that header portions of the plurality of MP4 files are collected in a first half portion of the file, and such that data portions of the plurality of MP4 files are collected in a second half portion of the file. As illustrated in FIG. 11, in the case where the header information common to the plurality of MP4 files or the header information (such as 'ftyp' and 'mmpu' box) unnecessary for the storage and the presentation exists, the overlapping header information may be deleted. FIG. 11 is a view illustrating the data in the media file when the data is rearranged in the media file. FIG. 11(a) is a view illustrating a configuration of the data in the media file before the data is rearranged. FIG. 11(b) is a view illustrating a configuration of the data in the media file after the data is rearranged.

For example, in the case where the MP4 files differ from each other in initialization information, it is necessary to correct the header. That is, in the case where the initialization information on the Nth MP4 file differs from the initialization information on the first MP4 file by comparing the initialization information on the Nth MP4 file to the initialization information on the first MP4 file, the initialization information on the Nth MP4 file is added to the initialization information on the first MP4 file, and a reference destination in 'moof' of the Nth MP4 file may be changed such that the initialization information added to the initialization information on the first MP4 file can be referred to when the processing is performed on the Nth MP4 file.

The MP4 files of the plurality of media may be stored in one media file. For example, the video MP4 file and the audio MP4 file may alternately be stored in a random access unit.

For the long playback time, the media file may be stored while divided into the plurality of files. In this case, the divided file of the audio file may be divided according to a divided time interval of the video file.

In the case where the storage is performed by receiving the MP4 file transmitted through a plurality of transmission passages, the storage is performed in asynchronization with a delay time between the transmission passages, and such synchronization processing that the post-storage MP4 files are rearranged based on the MP4 sequence number may be performed.

The plurality of MP4 files is previously stored in a transmission server in the media file or control file form of the exemplary embodiment, and a receiving apparatus (storage apparatus 100) may download the file from the transmission server through a broadcasting transmission passage or a communication transmission passage, and store the file.

The MP4 file obtained by the download through the broadcasting transmission passage or the communication transmission passage and the MP4 file obtained by streaming are stored, and MP4 files may be rearranged after the storage.

In the case where the MP4 file including the scalable coded data is stored, even if an extension layer differs from a basic layer in the media ID, the MP4 files in the extension layer and the basic layer may be stored in one media file, or stored in different media files in each layer. In the case where the MP4 files in the basic layer and the extension layer are stored in one media file, the corresponding MP4 files of the basic layer and the extension layer may alternately be stored. The media only in the basic layer may be stored. The data that the media file is scalable coded data and the identifier enabling the identification of a hierarchy level are stored in the control file in which the program information is described.

In the case where the received plurality of MP4 files are stored, an identifier or a flag indicating a state of the stored media may be provided to the stored media file. For example, an identifier or a flag indicating whether the stored media become complete may be provided to the stored media in the media file or the control file. The flag is stored in the media file or the control file. For example, whether the stored media become complete can be determined from the identifier of the media or the sequence number of the media. For example, the sequence number of the media is the MPU sequence number indicating the order of the MPU in the asset, the sequence number indicating the order of the packet in the asset, the sequence number indicating the order of the MMT packet, or the sequence number of the fragmented payload, and the sequence number of the media is indicated by the data unit or the header of the MMT packet or MMT payload. Therefore, the flag can be provided according to a determination result. An identifier or a flag indicating that the stored media have no error may be provided. In the case where an error exists in the MP4 file of a part of the stored media, or in the case where the MP4 file that cannot be obtained due to a packet loss exists, only the specific MP4 file may be download from a server and stored, or the whole media file may be downloaded to complement the media.

An identifier or a flag indicating that the stored media are rearrangeable or the rearrangement of the stored media is completed may be provided. An identifier or a flag indicating that the stored media can be played back and viewed may be provided.

For example the determination of the rearrangeable state can be made in the case where the media have no error or become complete. For the program in which the rearrangement is required, the determination that the stored media can be played back and viewed may be made only in the case where the rearrangement is completed.

A content producer may transmit conditions of the storage, rearrangement, and playback and viewing of the program or the signaling information on the permissible storage format, use the conditions or the signaling information together with the identifier or flag indicating the storage state, thereby assigning or limiting the operation of the storage content.

The content producer may previously provide an individual ID that can uniquely assign the program or the media, and the individual ID may be used on the reception side together with the program or the media. For example, the stored program can be played back by assigning the individual ID from the data broadcasting, WEB content, or application.

For example, in the case where the program is constructed with media A transmitted through the broadcasting and stored media B, a storage apparatus is indicated as transmission passage information (location information) on media B and the individual ID is assigned as the media ID in the program information. In the case where the storage apparatus is indicated as the location information in the receiving apparatus, the individual ID of the media is searched from the program information in the previously-registered storage apparatus, and played back while synchronized with media A transmitted through the broadcasting.

The plurality of MP4 files may be converted into one MP4 file after analyzed to reconstruct one elementary stream. The plurality of media are stored in the MP4 file as a plurality of tracks. The random access table, the program information, and the control information indicating the recording position may be generated based on the analysis result of the MP4 header.

The MMT packet can directly be stored. In the case where the MMT packet is directly stored, the time stamp indicating an arrival clock time of the MMT packet is provided during the storage. The time stamp may be provided before the MMT packet header, or stored in the MMT packet header (for example, an NTP time stamp area). In the case where the MMT packets transmitted through the plurality of transmission passages are rearranged in the sequence order, the time stamp is provided after the rearrangement. In the case where the unnecessary header information exists in the MMT packet header, the MMT payload header, the MFU header, and the like, the storage may be performed after the unnecessary header is deleted. In the case where the header is deleted, information indicating that the header is deleted is stored. The stored data is played back based on the time stamp. Program information or a random access table may be generated.

The MMT system can perform the storage in the plurality of storage formats (the MMT packet and the MP4 file format), and the storage method may be selected from the plurality of storage methods. The storage may be performed using the plurality of storage methods.

Each of the storage methods has the feature of a storage data amount, a data configuration, playback throughput, and the like. A user may select the storage method in the plurality of selection methods. The receiving apparatus may automatically select the storage method according to playback use. For example, a method for directly storing the directly transferable MMT packet is selected in the case where the stored program is transferred to another device.

The transmission side may transmit the signaling information assigning the storage format and the storage method, and the receiving apparatus may perform the storage by the assigned storage format and storage method.

Others

The method for storing the pieces of data transmitted using the MMT system is described above by way of example. Alternatively, the media constituting one program can be received through the plurality of transmission passages by the different multiplexing systems or formats, and stored. In this case, an identifier being able to identify the multiplexing system or multiplexing format is stored in the control file including the program information.

In the random access table, the identifier that can identify the randomly accessible point by each multiplexing system is indicated with respect to a certain random access point. For example, in the case where the program is constructed with the MP4 file (MPU) packetized by the MMT system and the MP4 file (segment) packetized by the DASH system, a table indicating the MPU sequence number and the segment sequence number is produced with respect to a certain random access point. The random access table may previously be generated on the transmission side and transmitted through the broadcasting or communication, or the random access table may be produced while the post-reception data is analyzed.

In the case where the media are transmitted through the plurality of transmission passages using the different multiplexing systems in each piece of media, the time necessary for the division of the media may be equalized. The media are transmitted while the divided time is equalized, which allows the random access point to be easily produced.

The format may be converted into one of the formats after the storage. The transmission side may assign the format used to perform the storage.

In each exemplary embodiment, each component may be constructed with dedicated hardware, or made by executing a software program suitable for each component. Each component may be made such that a program execution part such as a CPU and a processor reads and executes the software program recorded in a hard disk or a recording medium such as a semiconductor memory. Software implementing the transmission apparatus and reception apparatus of the exemplary embodiment is as follows.

That is, the program causes a computer to perform a storage method including a reception step of receiving a coded stream including a plurality of files that are of a data unit in a predetermined file format, a storage step of storing the received plurality of files of the coded stream in a memory, and a generation step of generating first control information used to play back the stored plurality of files, the first control information correlating the plurality of files.

The program may cause the computer to perform a playback method for playing back a plurality of files stored in a memory, the plurality of files being a data unit in a predetermined file format, the playback method including a first obtaining step of acquiring control information used to play back the plurality of files, the control information correlating the plurality of files, an analysis step of analyzing the obtained control information, a second obtaining step of acquiring a predetermined file in the plurality of files from the memory according to a result of the analysis step, and a playback step of playing back the obtained predetermined file.

In the exemplary embodiment, the processing performed by a specific processor may be performed by another processor. The sequence of the plurality of pieces of processing may be changed, or the plurality of pieces of processing may concurrently be performed.

The comprehensive or specific aspect of the present disclosure may be implemented by a system, a method, an integrated circuit, a computer program, or a recording medium such as a computer-readable CD-ROM. The comprehensive or specific aspect of the present disclosure may be implemented by any combination of the system, the method, the integrated circuit, the computer program, and the recording medium.

Although the transmission method and reception method of the exemplary embodiment of the present disclosure are described above, the present disclosure is not limited to the exemplary embodiment. Various modifications of the exemplary embodiment conceived by those skilled in the art and the combinations of the components of the different exemplary embodiments may also be included in the present disclosure as long as the modifications and combinations do not depart from the present disclosure.

The present disclosure is useful for the storage method and storage apparatus for being able to store the received coded data and the playback method and playback apparatus for being able to play back the stored coded data.

What is claimed is:

1. A storage method executed by a storage apparatus including a memory storing a program and a processor, the processor executing the program to perform operations of the storage method comprising:

receiving in conformity with MPEG Media Transport, MMT, a coded stream including a plurality of MP4 files that are of a media processing unit, MPU, received in conformity with MMT standard and each of the plurality of MP4 files is a random accessible file having a random access unit with a random access point, wherein the plurality of MP4 files include a plurality of MP4 files of a first media and a plurality of MP4 files of a second media, and the coded stream further includes second control information, the second control information including a playback time corresponding to the random access point of the plurality of MP4 files of the first media and the plurality of MP4 files of the second media;

accumulating and storing the received plurality of MP4 files of the coded stream in a memory; and generating, by analyzing the second control information, first control information used to play back the stored plurality of MP4 files when the plurality of MP4 files are stored in the memory, the first control information correlating the plurality of MP4 files of the first media and the plurality of MP4 files of the second media according to the playback time, and the first control information including a playback order, playback start times and information indicating recording positions in the memory of the plurality of MP4 files stored in the memory.

2. The storage method according to claim 1, wherein in the generating, information indicating order of playing back the plurality of MP4 files is generated as the first control information.

3. The storage method according to claim 2, wherein in the generating, time information indicating the playback start time of each of the plurality of MP4 files is generated as the first control information.

4. The storage method according to claim 3, wherein, in the generating, the information correlating the plurality of MP4 files of the first media pertaining to a first MP4 file and the plurality of MP4 files of the second media pertaining to a second MP4 file is generated as the first control information, the first MP4 file and the second MP4 file being identical to each other in the playback start time.

5. A playback method executed by a playback apparatus including a memory storing a program and a processor, the processor executing the program to perform operations of the playback method for playing back a plurality of MP4 files stored in the memory, the playback method comprising:

obtaining first control information used to play back the plurality of MP4 files, the first control information correlating, out of the plurality of MP4 files, a plurality of MP4 files of a first media and a plurality of MP4 files of a second media according to a playback time corresponding to a random access point of the plurality of MP4 files of the first media and the plurality of MP4 files of the second media, the first control information including a playback order, playback start times and information indicating recording positions in the memory of the plurality of MP4 files when the plurality of MP4 files are stored in the memory;

analyzing the obtained first control information;

obtaining a predetermined MP4 file in the plurality of MP4 files from the memory according to a result of the analyzing; and playing back the obtained predetermined MP4 file, wherein the plurality of MP4 files are a media processing unit, MPU, received in conformity with MMT standard, each of the plurality of MP4 files is a random accessible file having a random access unit with the random access point, and a coded stream includes second control information, the second control information including the playback time.

6. A storage apparatus comprising:

a memory configured to store a program; and a processor configured to execute the program and control the storage apparatus to:

receive in conformity with MPEG Media Transport, MMT, a coded stream including a plurality of MP4 files that are of a media processing unit, MPU, received in conformity with MMT standard and each of the plurality of MP4 files is a random accessible file having a random access unit with a random access point, wherein the plurality of MP4 files include a plurality of MP4 files of a first media and a plurality of MP4 files of a second media, and the coded stream further includes second control information, the second control information including a playback time corresponding to the random access point of the plurality of MP4 files of the first media and the plurality of MP4 files of the second media;

accumulate and store the plurality of MP4 files of the coded stream received by the receiver; and generate, by analyzing the second control information, first control information used to play back the plurality of MP4 files when the plurality of MP4 files are stored, the first control information correlating the plurality of MP4 files of the first media and the plurality of MP4 files of the second media according to the playback time, the first control information includes a playback order, playback start times and information indicating recording positions in the memory of the plurality of MP4 files stored in the memory.

7. A playback apparatus that plays back a plurality of MP4 files stored in a memory, the playback apparatus comprising:

the memory configured to store a program; and a processor configured to execute the program and control the playback apparatus to:

obtain first control information used to play back the plurality of MP4 files, the first control information correlating, out of the plurality of MP4 files, a plurality of MP4 files of a first media and a plurality of MP4 files of a second media according to a playback time corresponding to a random access point of the plurality of MP4 files of the first media and the plurality of MP4 files of the second media, the first control information includes a playback order, playback start times and information indicating recording positions in the memory of the plurality of MP4 files when the plurality of MP4 files are stored in the memory;

analyze the obtained first control information obtained;

obtain a predetermined MP4 file in the plurality of MP4 files from the memory according to a result of the analyzing; and play back the predetermined MP4 file obtained, wherein the plurality of MP4 files are a media processing unit, MPU, received in conformity with MMT standard, each of the plurality of MP4 files is a random accessible file having a random access unit with the random access point, and a coded stream includes second control information, the second control information including the playback time.

* * * * *